United States Patent
Bannai

[11] Patent Number: 6,109,942
[45] Date of Patent: Aug. 29, 2000

[54] ROTARY CONNECTOR

[75] Inventor: Hiroyuki Bannai, Miyagi-ken, Japan

[73] Assignee: Alps Electric Co., Ltd., Tokyo, Japan

[21] Appl. No.: 09/303,001

[22] Filed: Apr. 30, 1999

[30] Foreign Application Priority Data

May 6, 1998 [JP] Japan ..................... 10-123515

[51] Int. Cl.$^7$ ..................... H01R 3/00
[52] U.S. Cl. ..................... 439/164; 439/15
[58] Field of Search ..................... 439/15, 164

[56] References Cited

U.S. PATENT DOCUMENTS

| | | | |
|---|---|---|---|
| 5,286,219 | 2/1994 | Ueno | 439/475 |
| 5,772,456 | 6/1998 | Ohishi | 439/164 |

FOREIGN PATENT DOCUMENTS 695 000 A2   1/1996   European Pat. Off. .

OTHER PUBLICATIONS

Japanese Utility Model Publication No. 4–24611, dated Jun. 10, 1992.

*Primary Examiner*—Khiem Nguyen
*Attorney, Agent, or Firm*—Brinks Hofer Gilson & Lione

[57] ABSTRACT

A rotary connector which uses two flat cables and simplifies a process of connecting both the flat cables to a lead block. In this rotary connector, a through hole and a pair of window holes are formed in a supporting element of an outer lead block. Left-hand side and right-hand side groups of a plurality of joint bars are exposed in the window holes. Necessary first and second flat cables are preliminarily connected to one another into a flat cable. Further, each of conductors placed near this flat cable is exposed. Furthermore, the exposed portion of each of the conductors is made to overlap with the exposed portion of a corresponding one of joint bars, which are exposed in both the window holes of the outer lead block. The conductors are connected to the joint bars at two connection portions placed in a direction, in which the conductors extend, by ultrasonic-welding or spot-welding. Subsequently, the conductors exposed to the through hole are cut and divided into those connected to the two flat cables and that are electrically independent of each other.

6 Claims, 3 Drawing Sheets

CUTOFF

ROTARY CONNECTOR

BACKGROUND OF THE INVENTION

1. Field of the Invention

The present invention generally relates to a rotary connector to be used as an electrical connection means for an airbag system and so on. More particularly, the present invention relates to a rotary connector of the type that leads a flat cable accommodated in a space defined between a pair of housings to the exterior through a lead block.

2. Description of the Related Art

A rotary connector broadly comprises a pair of housings connected in such a way as to be concentric with and rotatable with respect to each other and a flat cable accommodated in a space defined between these housings. The ends of flat cable respectively fixed to these housings are electrically led to the exterior of the space. One of the housings is used as a stationary member, while the other is used as a movable member. When the movable housing is rotated clockwise or counterclockwise with respect to the stationary housing, the flat cable is wound or unwound in the space.

The rotary connector broadly configured in this manner is used as an electrical connection means for an airbag system and a horn circuit by respectively attaching the stationary housing and the movable housing to a stator member, such as a steering column, and a steering wheel acting as a rotor member. At that time, both the ends of the flat cable need to be connected to the stator member and an electric component mounted on the steering wheel. A rotary connector disclosed in the Japanese Utility Model Publication No. 4-24611 Official Gazette is configured so that both the ends of the flat cable are electrically led to the exterior through a lead block fixed to the housings. This lead block has a plurality of joint bars supported by insulating members. The lead block and the flat cable are accurately positioned in the connector. In this state, each of the joint bars is ultrasonically welded to a corresponding conductor. Then, the lead block is fixed at a predetermined place in the housing.

Meanwhile, in recent years, there have been demands for increasing the number of electrical circuits to be connected by a rotary connector. A rotary connector adapted to accommodate two flat cables in the space defined between the housings as described in the European Patent Application Publication No. EP0695000A2 is proposed as one supporting multi-circuit applications. However, in the case of using two flat cables, a lead block needs to be connected to each of the flat cables. Such a connecting operation involves a high-precision positioning process. This raises the problem that a process of manufacturing an entire rotary connector is very complex.

SUMMARY OF THE INVENTION

Accordingly, an object of the present invention is to provide a rotary connector that solves the problem of the conventional rotary connector.

To achieve the foregoing object, according to the present invention, there is provided a rotary connector which comprises a pair of housings that are coaxially and relatively rotatably connected to each other, two flat cables accommodated in a space defined between these housings, and a lead block fixed to the housings. At least one end portion of each of conductors of the aforesaid flat cables is led to the exterior of the aforesaid housings through joint bars supported by the aforesaid lead block. Joint bars, the number of which is more than that of the conductors of a single flat cable, are provided on the common lead block. The conductors of the single flat cable are connected to the aforesaid joint bars at two connection portions placed in a direction in which the conductors extend. Subsequently, the single flat cable is divided into two flat cables, which are electrically independent of each other, by cutting the aforesaid conductors between these connection portions.

In the rotary connector configured as described hereinabove, the lead block may be divided into two lead blocks when the single flat cable is divided into two flat cables. Each of the two lead blocks are connected to a corresponding one of the two flat cables. Thus, the degree of flexibility in placing the lead blocks in the housings is increased.

Further, in the rotary connector constructed as described herein-above, the common lead block may be maintained as one piece without being cut when the single flat cable is divided into the two flat cable. In this case, one lead block is connected to the two flat cables. Thus, an operation of fixing the lead block to the housings is accomplished at a time.

Other features, objects and advantages of the present invention will become apparent from the following description of a preferred embodiment with reference to the drawings in which like reference characters designate like or corresponding parts throughout several views.

DETAILED DESCRIPTION OF THE PREFERRED EMBODIMENT

Figure 1:
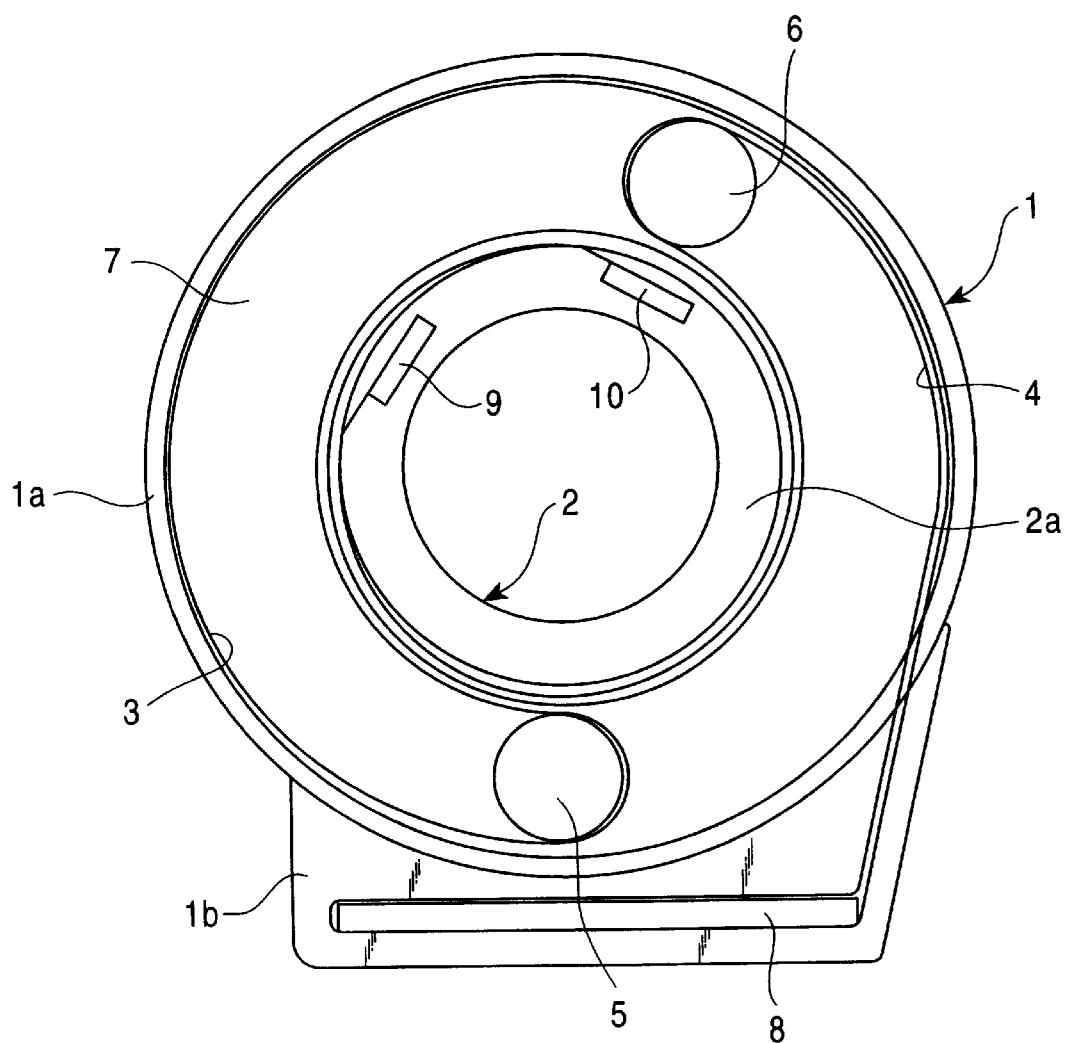
FIG. 1 is a plan view schematically illustrating a rotary connector embodying the present invention.
Figure 2:
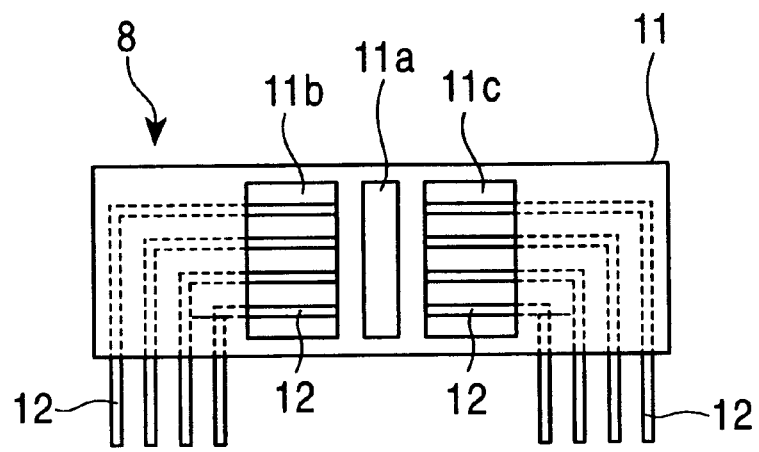
FIG. 2 is a plan view of an outer lead block.
Figure 3:
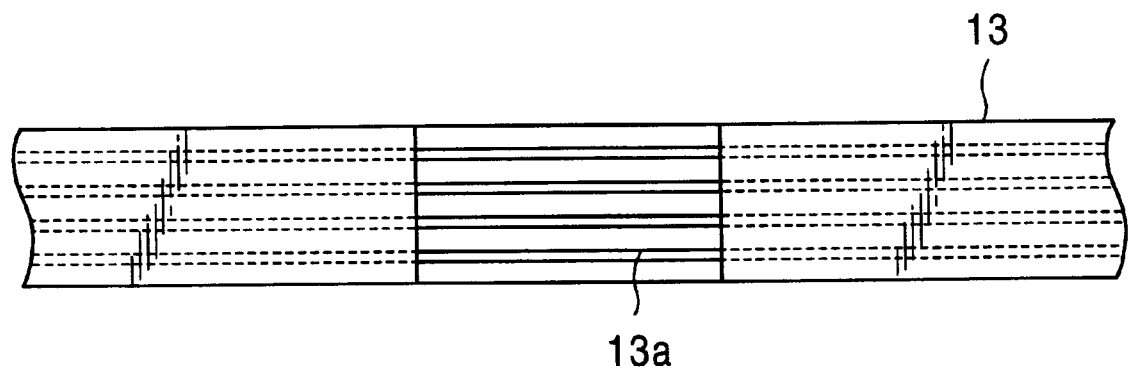
FIG. 3 is a plan view of a flat cable in the state before the cable is divided.
Figure 4:
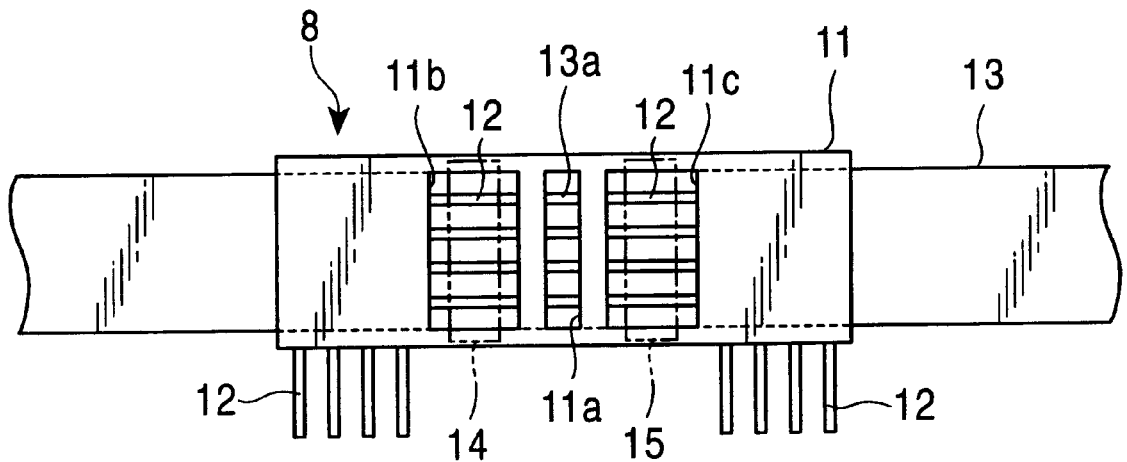
FIG. 4 is a plan view illustrating a state in the midst of a process of connecting the outer lead block and the flat cable.
Figure 5:
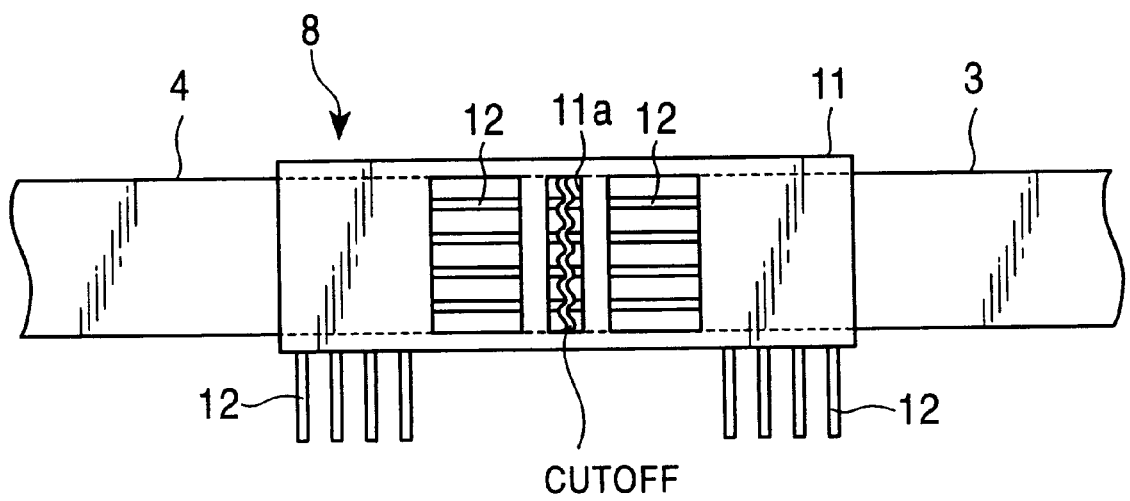
FIG. 5 is a plan view illustrating a state after the outer lead block is connected to the flat cable.

Hereinafter, the preferred embodiment of the present invention will be described in detail by referring to the accompanying drawings. FIG. 1 is a plan view schematically illustrating a rotary connector. FIG. 2 is a plan view of an outer lead block. FIG. 3 is a plan view of a flat cable in the state before the cable is divided. FIG. 4 is a plan view illustrating a state in the midst of a process of connecting the outer lead block and the flat cable. FIG. 5 is a plan view illustrating the state after the outer lead block is connected to the flat cable.

As shown in FIG. 1, the rotary connector embodying the present invention broadly comprises a stationary housing 11, a movable housing 2 rotatably attached to the stationary housing 1, first and second flat cables 3 and 4 accommodated between these housings 1 and 2, and a pair of rollers 5 and 6 around which the turned-back loop portions of the flat cables 3 and 4 are respectively wound. The stationary housing 1 has a cylindrical outer ring wall 1a. The movable housing 2 has a cylindrical inner ring wall 2a. A ring-like cable-accommodating portion 7 is defined between the outer ring wall 1a and the inner ring wall 2a. For convenience of description, the cable-accommodating portion 7 is illustrated in FIG. 1 as being opened at the top and bottom ends. Actually, the cable-accommodating portion 7 is covered by the stationary housing 1. A movable element (not shown) is rotatably placed in this cable-accommodating portion 7. Both the rollers 5 and 6 are rotatably supported by the movable element. A holding portion 1b protruding outwardly from the aforementioned outer ring wall 1a is formed thereon. An outer lead block 8 is fitted into and fixed to a groove provided in this holding portion 1b. As will be described later, the outer ends of the first and second flat cables 3 and 4 are connected to the outer lead block 8. The outer ends of the flat cables 3 and 4 are electrically led to the exterior of the stationary housing 1 through this outer lead block 8. On the other hand, the inner ends of the flat cables 3 and 4 are connected to the inner lead blocks 9 and 10 fixed to the inner ring wall 2a, respectively. Thus, the ends of the cables 3 and 4 are electrically led to the exterior of the movable housing 2 through these inner lead blocks 9 and 10.

When, for example, the movable housing 2 is rotated clockwise in the rotary connector constructed in the aforementioned manner, as viewed in FIG. 1, the turned-back portions of the flat cables 3 and 4 move the cable-accommodating portion 7 clockwise by an amount of rotation, which is less than that of the movable housing 2. The winding condition of the flat cables 3 and 4 is a wound condition where a larger amount of cable is placed at the side of the inner ring wall 2a. Conversely, when the movable housing 2 is rotated counterclockwise, as viewed in FIG. 1, the turned-back portions of the flat cables 3 and 4 move the cable-accommodating portion 7 counterclockwise by an amount of rotation, which is less than that of the movable housing 2. The winding condition of the flat cables 3 and 4 is an unwound condition where a larger amount of cable is placed at the side of the outer ring wall 1a. Incidentally, when the cables are wound and unwound, the rollers 5 and 6 and the movable element rotatably supporting these rollers are subjected to forces exerted from the turned-back portions of the flat cables 3 and 4 and are moved in the same direction.

Next, a method of connecting the aforementioned lead block 8 and the aforesaid flat cables 3 and 4 to one another will be explained hereinbelow. As shown in FIG. 2, the outer lead block 8 comprises a supporting element 11 made of insulating resin, and a plurality of joint bars 12 outserted to this supporting element 11. This embodiment uses eight joint bars 12. A through hole 11a is formed in the central portion of the supporting element 11. A pair of window holes 11b and 11c are formed on the sides of the through hole 11, respectively. Each of the joint bars 12 is bent in the supporting element 11. Four joint bars 12 shown in the left-side part of this figure are exposed into one 11b of the window holes, while four joint bars 12 shown in the right-side part of this figure are exposed into the other window hole 11c.

In the case that the outer ends of the first and second flat cables 3 and 4 are connected to this outer lead block 8, the flat cables 3 and 4 are connected to each other as one piece before this step of connecting the outer ends thereof to the lead block 8. Namely, as shown in FIG. 3, one piece of flat cable (designated by a reference character 13, for convenience) is constituted by a belt-like element in which a pair of insulating films are laminated on a plurality of parallel conductors 13a. The length of this one piece of flat cable is set as being equal to a sum total of lengths of the flat cables 3 and 4. This embodiment uses the four-circuit flat cable 13 having four conductors 13a. Each of the conductors 13a placed near the center of the flat cable 13 is exposed by removing one of the insulating films.

Further, as illustrated in FIG. 4, the exposed portion of each of the conductors 13a of the flat cable 13 is made to overlap with a corresponding one of the joint bars 12 exposed into the window holes 11b and 11c provided in the outer lead block 8. Then, the conductors 13a are connected to the joint bars 12 at two connection portions 14 and 15, which are indicated by two-dot chain lines in this figure, by ultrasonic-welding or spot-welding. Thus, two joint bars 12 are connected in parallel to each of the conductors 13a. At that time, the connection portions 14 and 15 are away from each other at a sufficient distance in a direction in which each of the conductors 13a extends. Consequently, the parallelism between the conductors 13a and the joint bars 12 is easily calculated. Thus, the positioning of the flat cable 13 with respect to the outer lead block 8 is easily performed with high accuracy.

Thereafter, as illustrated in FIG. 5, each of the conductors 13a of the flat cable 13 exposed into the through hole 11a provided in the outer lead block 8 is cut. At that time, a group of the joint bars 12, which are connected in parallel to the conductors 13a and shown in the left-side part of this figure, are electrically independent of a group of the joint bars 12 connected in parallel to the conductors 13a and shown in the left-hand side part thereof. Further, the group of the joint bars 12 shown in the right-hand side part of this figure are connected to the conductors of the first flat cable 3, respectively. The group of the joint bars 12 shown in the left-hand side part of this figure are connected to the conductors of the second flat cable 4, respectively. In this case, it is sufficient that at least the conductors 13a are cut in the through hole 11a. If the flat cable 13 is divided into two pieces by cutting the conductors 13a together with the insulating films.

Thus, the outer ends of the first and second flat cables 3 and 4 are connected to the common outer lead block 8. Thereafter, when this outer lead block 8 is fitted into and fixed to the groove provided in the holding portion 1b, the outer ends of the flat cables 3 and 4 are electrically led to the exterior of the stationary housing 1 through the outer lead block 8. At that time, in the case that the joint bars 12 of the outer lead block 8 are exposed to the bottom surface of the holding portion 1b, the joint bars 12 serves as terminals of a connector of the direct coupling type. Thus, the rotary connector is directly connected to a connector of an external device. Alternatively, the connector connection between a dedicated connector laid at the end of a lead wire and an external device may be established by connecting a lead wire to each of the joint bars 12 through ultrasonic welding.

In the aforementioned embodiment, each of the conductors 13a of one piece of the flat cable 13 is connected at the two connection portions 14 and 15 to a corresponding one of the joint bars 12 of the outer lead block 8. Subsequently, the flat cable 13 is divided into the first and second flat cables 3 and 4, which are electrically independent of each other, by cutting each of the conductors 13a between these connection portions 14 and 15. Thus, the outer lead block 8 is connected to the two flat cables 3 and 4 by once performing the positioning of the flat cables and the outer lead block. Consequently, the process of manufacturing the connectors is considerably simplified in comparison with the case that the flat cables 3 and 4 are connected to the outer lead block at different steps. Moreover, in the aforementioned embodiment, each of the conductors 13a is connected to a corresponding one of the joint bars 12 at the two connection portions 14 and 15 that are away from each other at a sufficient distance in the direction in which the conductors 13a extend. Thus, the parallelism between the conductors 13a and the joint bars 12 is easily calculated. Consequently, the positioning of the flat cables 13 and the outer lead block 8 is easily performed with high precision. Furthermore, in the aforementioned embodiment, the outer lead block 8 is not divided even after the flat cables 3 and 4 are connected thereto. Thus, the flat cables and the outer lead block are treated as a single unit. Consequently, the operation of fixing the outer lead block 8 to the stationary housing 1 at a predetermined place is achieved at a time.

Incidentally, the foregoing description of the embodiment has described the case that, even after both the flat cables 3 and 4 are connected to the outer lead block 8, this block is not divided and these flat cables and lead block are integral with one another. However, when the one piece 13 of flat cable is divided into the two pieces 3 and 4 of flat cable, the outer lead block may be cut and divided into two pieces, similarly as the one piece 13 of flat cable. In this case, the two pieces of the divided outer lead block 8 are finally connected to the outer ends of the flat cables 3 and 4, respectively. Thus, the two flat cables 3 and 4 are connected to the outer lead block 8 by performing the positioning thereof only once, similarly as in the aforementioned embodiment. Consequently, the process of manufacturing the connectors is substantially simplified in comparison with the case that the flat cables 3 and 4 are connected to the outer lead blocks at different steps.

Additionally, the foregoing description of the embodiment has described the case that the present invention is applied to the connection portions between the outer lead block 8 and each of the flat cables 3 and 4. The present invention, however, may be applied to the connection portions between the flat cables 3 and 4 and the inner lead blocks 9 and 10. In this case, the space, in which the inner lead blocks 9 and 10 are placed, at the side of the inner ring wall 2a is narrower than the space, in which the outer lead block 8 is placed, at the side of the outer ring wall 1a. Thus, it is preferable for increasing the degree of flexibility in placing the lead block that, when the one piece 13 of flat cable is divided into the two flat cables 3 and 4, the lead block to be connected thereto is divided into the two inner lead blocks 9 and 10.

The present invention is implemented by the aforementioned embodiment and has the following advantageous effects.

Necessary two flat cables are preliminarily connected to each other into one flat cable. Then, the conductors provided on this flat cable are connected to the joint bars of the lead block at the two connection portions provided in the direction in which the conductors extend. Subsequently, the conductors are cut between these connection portions and are divided into those provided on the two flat cables that are electrically independent of each other. Thus, the lead block is connected to the two flat cables by performing the positioning thereof only once. Consequently, the process of manufacturing the entire rotary connector is simplified. Moreover, the positioning of the flat cables and the lead block is easily achieved with high accuracy, because the flat cables and the lead block are positioned at the two connection portions that are away from each other in the direction in which the conductors extend.

Although the preferred embodiment of the present invention has been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A rotary connector comprising:

a pair of housings, coaxially and relatively rotatably connected to each other;

two flat cables accommodated in a space defined between said housings; and a lead block fixed to said housings, wherein at least one end portion of each of conductors of said flat cables is led to the exterior of said housings through joint bars supported by said lead block, and wherein a single flat cable is divided into said two flat cables, which are electrically independent of each other, by first providing said joint bars, the number of which is more than that of said conductors of a single flat cable, on said common lead block, and then connecting said conductors of said single flat cable to said joint bars at two connection portions placed in a direction in which said conductors extend, and subsequently, cutting said conductors between said connection portions.

2. The rotary connector according to claim 1, wherein each of said common lead block and said single flat cable is divided into two pieces by cutting said conductors.

3. The rotary connector according to claim 1, wherein said common lead block is maintained as one piece even after said conductors are cut.

4. The rotary connector according to claim 1, wherein, in each of said connection portions on a side of each of which said joint bars are connected to said conductors of said flat cables, insulating film of each of said two flat cables is left on an opposite side of each of said connection portions.

5. The rotary connector according to claim 2, wherein, in each of said connection portions on a side of each of which said joint bars are connected to said conductors of said flat cables, insulating film of each of said two flat cables is left on an opposite side of each of said connection portions.

6. The rotary connector according to claim 3, wherein, in each of said connection portions on a side of each of which said joint bars are connected to said conductors of said flat cables, insulating film of each of said two flat cables is left on an opposite side of each of said connection portions.

* * * * *

UNITED STATES PATENT AND TRADEMARK OFFICE
CERTIFICATE OF CORRECTION

PATENT NO. : 6,109,942
DATED : August 29, 2000
INVENTOR(S) : Hiroyuki Bannai

It is certified that error appears in the above-identified patent and that said Letters Patent is hereby corrected as shown below:

Title page,
ABSTRACT,
Column 2, line 9, insert -- the -- before "conductors".

Claim 1,
Line 7, insert -- the -- before "conductors".

Signed and Sealed this

Twenty-sixth Day of March, 2002

Attest:

JAMES E. ROGAN
*Attesting Officer*        *Director of the United States Patent and Trademark Office*